(12) United States Patent
Fu et al.

(10) Patent No.: US 9,731,535 B2
(45) Date of Patent: Aug. 15, 2017

(54) HIGH GLOSS PHOTO MEDIA AND METHOD OF MAKING SAME

(75) Inventors: Xulong Fu, San Diego, CA (US); Dheya M. Alfekri, San Diego, CA (US); Ronald J. Selensky, Poway, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 648 days.

(21) Appl. No.: 14/354,577

(22) PCT Filed: Oct. 27, 2011

(86) PCT No.: PCT/US2011/058179
§ 371 (c)(1),
(2), (4) Date: Apr. 26, 2014

(87) PCT Pub. No.: WO2013/062560
PCT Pub. Date: May 2, 2013

(65) Prior Publication Data
US 2014/0295112 A1    Oct. 2, 2014

(51) Int. Cl.
*B41M 5/00*     (2006.01)
*B41M 5/50*     (2006.01)
(Continued)

(52) U.S. Cl.
CPC ............. *B41M 5/506* (2013.01); *B32B 27/10* (2013.01); *B41M 5/504* (2013.01); *B41M 5/508* (2013.01);
(Continued)

(58) Field of Classification Search
CPC ...... B41M 5/506; B41M 5/504; B41M 5/508; B41M 7/0027; B41M 2205/38; B32B 27/10; Y10T 428/24802
See application file for complete search history.

(56) References Cited

U.S. PATENT DOCUMENTS 5,093,306 A    3/1992  Mukoyoshi et al.
5,356,853 A    10/1994 Ueno et al.
(Continued)

FOREIGN PATENT DOCUMENTS

JP    07-137469    5/1995
JP    11-268428    10/1999

OTHER PUBLICATIONS

International Search Report (ISR) (2 pages) from the Korean Intellectual Property Office (KIPO) dated Jun. 25, 2012, for foreign counterpart PCT patent application No. PCT/US2011/058179.

*Primary Examiner* — Betelhem Shewareged
(74) *Attorney, Agent, or Firm* — Dierker & Kavanaugh, P.C.

(57) ABSTRACT

A high gloss photo media that has a gloss at 20 degrees equal to or greater than 40% includes a photo media substrate that includes a gloss-enhancement film on a front side of a photo base material. A curl control material is on a back side of the photo base material opposite the front side. The gloss-enhancement film being a multilayer that includes an adherent layer and a layer of one of a polyester composition and a polypropylene composition. A thickness of the gloss-enhancement film is at least 20 microns. The high gloss photo media further includes an image receiving layer on the gloss-enhancement film.

15 Claims, 2 Drawing Sheets

(51) Int. Cl.

| | |
|---|---|
| *B32B 27/10* | (2006.01) |
| *G03C 1/76* | (2006.01) |
| *G03C 1/81* | (2006.01) |
| *G03C 1/93* | (2006.01) |
| *B41M 7/00* | (2006.01) |

(52) U.S. Cl.
CPC ......... *B41M 7/0027* (2013.01); *G03C 1/7614* (2013.01); *G03C 1/81* (2013.01); *G03C 1/93* (2013.01); *B41M 2205/38* (2013.01); *Y10T 428/24802* (2015.01)

(56) References Cited

U.S. PATENT DOCUMENTS

| | | | |
|---|---|---|---|
| 6,524,760 B1 | 2/2003 | Ikeuchi et al. | |
| 6,800,589 B2 | 10/2004 | Wachi et al. | |
| 6,833,168 B2 | 12/2004 | Lucas et al. | |
| 7,364,800 B2 | 4/2008 | Jesberger et al. | |
| 7,744,959 B2 | 6/2010 | Bi et al. | |
| 7,867,584 B2 | 1/2011 | Bi et al. | |
| 7,906,218 B2 | 3/2011 | Steichen et al. | |
| 2006/0115634 A1* | 6/2006 | Park | B32B 27/10 428/195.1 |
| 2008/0113287 A1 | 5/2008 | Nakamura et al. | |
| 2008/0166507 A1* | 7/2008 | Park | B41M 5/502 428/32.1 |
| 2009/0087597 A1 | 4/2009 | Omata et al. | |
| 2009/0122127 A1 | 5/2009 | Baker et al. | |
| 2011/0244214 A1* | 10/2011 | Steichen | B32B 27/10 428/304.4 |
| 2011/0293859 A1* | 12/2011 | Fu | B41M 5/504 428/32.18 |

\* cited by examiner

HIGH GLOSS PHOTO MEDIA AND METHOD OF MAKING SAME

CROSS-REFERENCE TO RELATED APPLICATIONS

N/A

STATEMENT REGARDING FEDERALLY SPONSORED RESEARCH OR DEVELOPMENT

N/A

BACKGROUND

Glossy photo quality media having a fiber or cellulose raw base or core is coated on a front side with a polyethylene (PE) layer to provide gloss. The PE layer may be extruded using a mirror image chill roll on an extruder. The back side of the raw base is extrusion coated using a mirror image chill roll as well, for example with PE, to facilitate curl control of the raw base among other things. The thickness or coat weight of the front side PE gloss coating can vary from about 15 grams per square meter (gsm) to about 25 gsm for typical photo media. An image receiving layer is also applied to the front side, on the PE gloss coating. The image receiving layer is compatible with materials typically used to form images, e.g., inks Photo quality media typically has a gloss at 20 degrees that ranges from about 26% to about 35% and an average distinctness of image (DOI) that is about 2.5 $mm^{-1}$. However, a minimum gloss that may be classified as high gloss for photo quality media is 40% gloss at 20 degrees, for example for inkjet photo printing. Moreover, the DOI should be greater than 3.5 $mm^{-1}$ for obtaining quality images on high gloss photo quality media. The coat weight of the PE coating on the front side of the photo quality media has been increased in an attempt to increase one or both of the gloss and increase the DOI, for example, but not without reaching a plateau at about 30 gsm coat weight that is still below the high gloss classification.

BRIEF DESCRIPTION OF THE DRAWINGS

Various features of examples in accordance with the principles described herein may be more readily understood with reference to the following detailed description taken in conjunction with the accompanying drawings, where like reference numerals designate like structural elements, and in which.

Figure 1A:
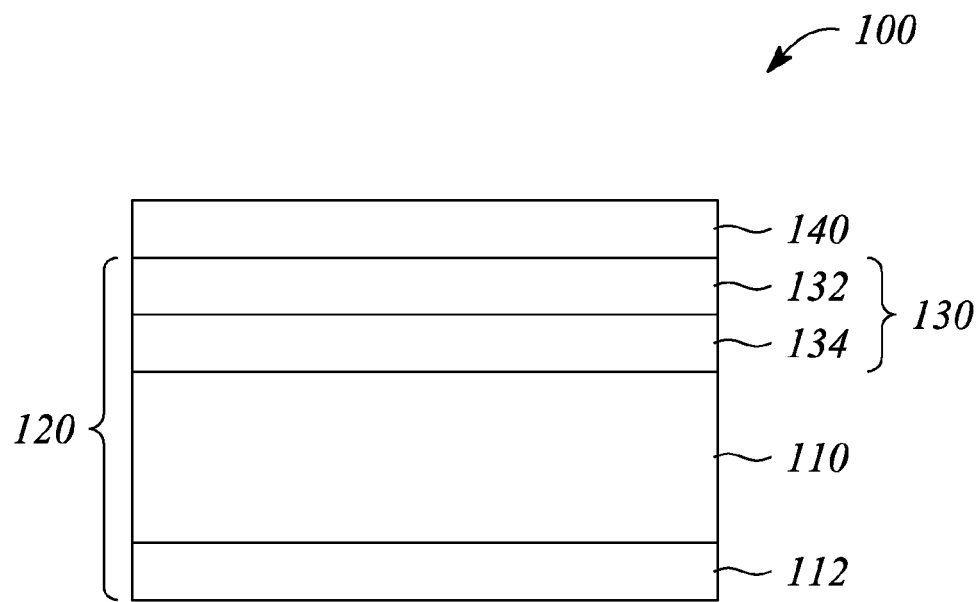
FIGS. 1A-1B illustrate side views of high gloss photo media according to examples in accordance with the principles described herein.

Certain examples have other features that are one of in addition to and in lieu of the features illustrated in the above-referenced figures. These and other features are detailed below with reference to the above-referenced figures.

DETAILED DESCRIPTION

Examples in accordance with the principles described herein are directed to a photo quality media having a high gloss and a distinctness of image that may match or exceed that of silver halide photographic paper, for example. In particular, a photo quality media in accordance with various examples herein has a high gloss that is equal to or greater than 40% (measured at 20 degrees) and a distinctness of image (DOI) that is equal to or exceeds 3.6 $mm^{-1}$. The high gloss photo media comprises a photo media substrate that includes a photo base material having a front side and a back side. The photo base material includes a curl control material on the back side. The photo media substrate further includes a gloss-enhancement film on the front side of the photo base material. The gloss-enhancement film comprises one of a polyester composition and a polypropylene composition and an adherent. The high gloss photo media further comprises an image receiving layer on the gloss-enhancement film. A method of making the high gloss photo media combines the photo base material and the gloss-enhancement film using one of lamination, extrusion and extrusion lamination.

The photo base material comprises a raw paper-based material of one or more of hardwood fibers, softwood fibers and recycled fibers. In some examples, the fibers may be refined to about 0.5 to about 3.0 mm in weighted average length. The raw paper-based material may further include one or more additives including, but are not limited to, inorganic fillers, pigments, internal sizing agents, optical brighteners, fixers, pH adjustors, emulsification products, strengtheners, and coloring agents. The additives are provided to the raw paper-based material to render the photo base material one or more of smooth, durable, strong, porous or nonporous, and water resistant, for example. Examples of inorganic fillers and pigments include, but are not limited to, ground calcium carbonate, precipitated calcium carbonate, titanium dioxide, kaolin clay, silicates, plastic pigment, alumina trihydrate and combinations of any of the above. Examples of internal sizing agents include, but are not limited to, one or more of metal salts of fatty acids, fatty acids, alkyl ketene dimer (AKD) emulsification products, epoxidized higher fatty acid amides, alkenyl acid anhydride emulsification products, alkylsuccinic acid anhydride (ASA) emulsification products, and rosin derivatives. Optical brightening agents (OBA) include, but are not limited to, a tetrasulfonated stilbene, for example. Fixers or binders include, but are not limited to, polyvinyl alcohol, ethers, latexes, and styrene acrylate copolymers, for example. In some examples, the raw paper-based material may include about 1% to about 40% filler by weight.

The total weight of the raw paper-based material may be within a range of about 125 grams per square meter (gsm) to about 250 gsm, for example. In some examples, the total weight of the raw base material is within the range of about 150 gsm to about 250 gsm, or about 150 gsm to about 225 gsm, or about 170 gsm to about 250 gsm. In some examples, the raw paper-based material has a roughness that is less than about 3 microns and a density of 0.9 grams per cubic centimeter ($g/cm^3$) or higher, for example, the paper roughness as measured using PPS 78 Park Print Surf (PPS) microprocessor-controlled instrument from Testing Machine Inc. (TMI), New Castle, Del., USA.

The curl control material on a back side of the photo base material provides flatness and photo feel (e.g., related to paper friction and roughness as in silver halide photo paper) to the photo media substrate and may provide one or more of stability, water resistance and protection from various environmental conditions, for example. In some examples, the curl control material is a film forming resin that includes, but is not limited to, one or more of a polyolefin resin, a polycarbonate resin, a polyester resin, and a polyamide resin. In some examples, the curl control material is a composition that comprises one or more inorganic fillers.

In some examples, the curl control material on the back side of the photo base material includes, but is not limited to, polyethylene (PE). For example, the PE may include low density PE (LDPE), medium density PE (MDPE), high density (HDPE), straight-chain LDPE, copolymers thereof with alpha olefin, a carboxy-modified PE resin, or a combination of one or more of the above. The curl control (film forming resin) material may be applied to the raw base material using coating techniques including, but not limited to, one or more of a hot melt extrusion process, a hot film lamination process, and a cold film lamination process, for example. In some examples, the coated photo base material is configured to provide physical and optical properties for inkjet image formation.

The gloss-enhancement film on a front side of the photo base material comprises either a polyester composition or a polypropylene composition and an adherent. The gloss-enhancement film may be applied to the photo base material using one or more of an extrusion process, a lamination process and an extrusion lamination process, for example. In some examples, a thickness or amount of the gloss-enhancement film on the raw photo base material may be at least 20 microns, or at least 25 microns, or at least 28 microns, or at least 30 microns, or at least about 32 microns. In some examples, the thickness or amount of the gloss-enhancement film is within a range of 20 microns to 60 microns, or within the range of 25 microns to 60 microns, or within the range of 28 microns to about 54 microns, or within the range of 30 microns to 52 microns, or within the range of about 32 microns to about 50 microns. In some examples, the amount or thickness of the gloss-enhancement film on the photo base material may depend on one or more of the nature and type of polyester composition or the nature and type of polypropylene composition used, and the nature or type of adherent used; and in some examples, whether the composition is extruded, laminated, or extrusion laminated, whether the lamination is a wet lamination or a dry lamination, and whether the extrusion is a hot extrusion. The photo media substrate described herein is configured to provide a high gloss photo media, for example for inkjet printing.

In some examples, the amount of the gloss-enhancement film on the front side of the photo media substrate is less than the amount of the curl control material on the back side of the photo media substrate. A ratio of total weight of the curl control material (on the back side) to the gloss-enhancement film (on the front side) is within a range of a ratio of 1.25 to a ratio of 3.75, for example. In some examples, the ratio range of the curl control material to the gloss-enhancement film is a ratio of about 1.5 to a ratio of about 3.0. In some examples, the ratio ranges from a ratio of about 1.5 to a ratio of about 3.5, or a ratio of about 1.75 to a ratio of about 3.5, or a ratio of about 1.75 to a ratio of about 3.0, or a ratio of about 2.0 to a ratio of about 3.5, or a ratio of about 2.0 to a ratio of about 3.0, or a ratio of about 2.5 to a ratio of about 3.5, or a ratio of about 2.5 to a ratio of about 3.0.

In some examples of the gloss-enhancement film, the polyester composition is a polyester material that includes, but is not limited to, one of polyethylene terephthalate (PET), glycol-modified PET, polybutylene terephthalate (PBT), polytrimethylene terephthalate (PTT), polyethylene naphthalate (PEN), polyether terephthalate, polyurethane terephthalate, or a combination or a mixture of two or more thereof. PET may be obtained from Chevron Phillips Chemical Company, The Woodlands, Tex., or from Formosa Plastics Corporation, USA, Livingston, N.J.

In other examples of the gloss-enhancement film, the polypropylene composition comprises homopolymers of polypropylene (PP) and poly(ethylene vinyl acetate) (EVA), for example two layers coextruded together (i.e., 'PP and EVA'). For example, the PP may be provided as a layer covering a layer of the EVA, or in some examples, the EVA may be a core material surrounded by the layer of PP. In some examples, the EVA layer is directly adjacent to the front side of the photo base material and is between the photo base material and the PP layer. In some examples, the EVA may facilitate adhesion of the PP to the photo base material. The PP film polymer and EVA film polymer (either separate or coextruded) may be obtained from film extruder companies and casting companies including, but not limited to, Fabrene, Ontario Canada; PGI Incorporated, Charlotte, N.C.; Worthen Industries, Nashua, N.H.; and SKC/SMP Corporation, Covington, Ga.

The gloss-enhancement film further comprises an adherent. The adherent is a material that facilitates adhesion of the respective composition to the photo base material. In some examples, the respective polyester composition or polypropylene composition is provided as a layer (or adjacent layers for PP and EVA composition) and the adherent is applied one of to a side of the respective composition layer and to a side of the photo base material, or may be provided as a separate adherent film layer. In particular, the adherent is directly adjacent to the front side of the photo base material and is between the photo base material and the respective composition layer.

The adherent includes either thermal adhesive materials or thermoplastic polymeric materials. In some examples, the adherent includes melted granules of PE, such as any of the PE materials listed above. In other examples, the adherent is an aqueous thermal adhesive including, but not limited to, casein, sodium silicate, starch, a starch-based adhesive, natural latex, synthetic latex, an acrylic copolymer-based adhesive, a pressure sensitive adhesive, or a combination or mixture of two or more thereof. In some examples, the adherent has an adhesion rating of less than 3, where a rating of 1 is equivalent to a best rating and a rating of 5 is equivalent to a worst rating. The adhesion rating was obtained by using a standard ASTM test method, for example, ASTM Test Method D 3359. Thermal adhesives including, but not limited to, hot melt and self cross linkable adhesives such as Morstik™ 717 (an acrylic) or Ethocel™ ethylcellulose polymers, may be obtained from Dow Chemical Company, for example; and other thermal adhesives for coating and laminating may be obtained from Omnova Solutions, Inc., Fairlawn, Ohio; BASF Corporation, North America; and U.S. Adhesives, Chicago, Ill., for example.

The adherent layer is provided to the photo media substrate in an amount by coat weight of at least 0.5 gsm, or at least 5 gsm, or at least 10 gsm, for example. In some examples, the amount of the adherent layer is within a range of 0.5 gsm to 30 gsm, 0.5 gsm to 25 gsm, or 5 gsm to about 25 gsm, or about 10 gsm to about 25 gsm, or about 10 gsm and about 20 gsm. In some examples, the amount of adherent may depend on one or both of the nature and type of the adherent and the nature and type of the polyester composition or the nature and type of the polypropylene composition that are used. An amount by thickness or by coat weight of the respective layer of either the polyester composition or the polypropylene composition (i.e., the 'respective polymer composition') may be correspondingly within a range of 42 microns and 10 microns, for example. In some examples, the thickness of the respective polymer composition layer may be correspondingly within the range of about 40 microns and about 12 microns, or about 35 microns and about 12 microns, or about 30 microns and about 12 microns. In some examples, a ratio of the amount of the respective polymer composition to the amount of the adherent is 4 to 1 or 3 to 2, or in some examples, 3 to 5, or 1 to about 2.

As mentioned above, the high gloss photo media further comprises an image receiving layer on the gloss-enhancement film. The image receiving layer is a composition that is configured to receive and retain an imaging material, for example an ink or a toner, that is applied to a surface of the image receiving layer in a pattern or an image. The image receiving layer has one or both of good affinity and good compatibility for the imaging material that is applied to the image receiving layer surface to form the photographic image. For example, the image receiving layer is able to absorb liquid applied to it and in that sense may be considered porous.

The image receiving layer may comprise one or both of an inorganic material and an organic material. Examples of inorganic materials include, but are not limited to, metal oxides or semi-metal oxides such as, for example, silica, alumina, hydrous alumina (for example, boehmite and pseudo-boehmite), calcium carbonate, silicates (for example, aluminum silicate and magnesium silicate), titania, zirconia, calcium carbonate, and clays, and combinations thereof. Examples of organic materials include, but are not limited to, organic polymeric compositions comprising one or more polymers such as, for example, polyolefins, polyesters, polyamides, ethylene copolymers, polycarbonates, polyurethanes, polyalkylene oxides, polyester amides, polyalkyloxazolines, polyphenyl oxazolines, polyethylene-imines, polyvinyl pyrrolidones, and combinations of two or more of the above.

In some examples, the image receiving layer includes treated or modified silica or treated or modified fumed silica. In some examples, the silica or fumed silica is treated with an inorganic treating agent and a monoaminoorganosilane treating agent. In some examples, the image receiving layer includes a combination of boehmite and a binder material such as, for example, an organic polymeric composition as discussed above. In some examples, the image receiving layer comprises modified or unmodified alumina. In some examples, the alumina can comprise pseudo-boehmite. In some examples, the image receiving layer is suited for inkjet ink imaging materials, where the inkjet inks are applied to the image receiving layer surface with an inkjet printer or press to produce a printed photographic image.

In some examples, the image receiving layer is a composition that comprises one or more of a high porosity inorganic oxide dispersion, a binder and other additives. For example, the high-porosity, inorganic oxide dispersion includes any number of inorganic oxide groups including, but not limited to, a fumed silica or alumina treated with silane coupling agents containing functional groups. In some examples, the composition may comprise about 70% to about 100% dry weight of fumed silica. The fumed silica includes, but is not limited to, CAB-O-SIL® M-5 or CAB-O-SIL® MS-55 from Cabot; ORISIL™ 200, ORISIL™ 250 or ORISIL™ 300 from Orisil, Ltd., Ukraine; or AEROSIL® 200 or AEROSIL® 300 from Degussa (Evonik Industries). The composition may further comprise about 5% to about 15% dry weight of an organosilane treating agent. Examples of organosilane treating agents that may be used include, but are not limited to, Silquest® A-1100 gamma-aminopropyl-triethoxysilane (registered trademark of Crompton Corp. or its subsidiaries) available from GE; or Dynasylan® (DS) 1189 N-(n-Butyl)-3-aminopropyl-trimethoxy-silane available from Degussa (Evonik Industries). The composition may further comprise about 1% to about 5% dry weight of an inorganic treating agent. An example of the inorganic treating agent that may be used includes, but is not limited to, an aluminum chlorohydrate (ACH) such as Locron® P from Clariant. The composition may further comprise about 0.1% to about 1% dry weight of a surfactant. An example of the surfactant that may be used includes, but is not limited to, SILWET® L-7600 organosilicone from GE. The composition may further comprise about 1% to about 5% dry weight of a binder cross-linker An example of the binder crosslinker that may be used includes, but is not limited to, boric acid available from Aldrich Inc. The composition may further comprise about 15% to about 30% dry weight of a binder. The binder material includes, but is not limited to, one or more of polyvinyl alcohol, polyvinyl acetate, polyvinyl acrylate, polyvinyl acrylate esters, polyvinyl methacrylate, polyvinyl methacrylate esters, mixtures thereof, copolymers of monomer units thereof, and combinations thereof. An example of a water soluble binder that may be used includes, but is not limited to, polyvinyl alcohol (PVA) sold under the trade name MOWIOL® 40-88 or Poval 235 available from Kuraray America, Inc.

The image receiving layer is associated with the photo media substrate by a deposition process directly onto the gloss-enhancement film. In some examples, the image receiving layer may be applied to the photo media substrate as an aqueous coating or suspension, and then dried. For example, the image receiving layer may be applied to the photo media substrate using coating techniques including, but not limited to, slot die application, roller application, fountain curtain application, blade application, rod application, air knife application, gravure application, and air brush application. The applied image receiving layer is dried by convection, conduction, infra-red radiation, atmospheric exposure, or a combination of one or more of these, for example. An amount by coat weight of the image receiving layer on the photo media substrate is within a range of 20 gsm to 35 gsm, for example. In some examples, the amount by coat weight of the image receiving layer is within the range of about 25 gsm to 32 gsm, or about 28 gsm to about 32 gsm.

In some examples, the image receiving layer has a microporous surface. In other examples, the surface of the image receiving layer is swellable. The properties of the surface of the image receiving layer may depend on, for example, one or both of the image receiving materials used and the imaging materials that are intended to be used.

The image receiving layer on the photo media substrate changes the gloss of the photo media substrate for example when the image receiving layer has a microporous surface. For example, the photo media substrate, as described above, may have a gloss at 20 degrees that ranges from 60% to 110% before the image receiving layer is applied to create the photo media. In some examples, the photo media substrate has a gloss at 20 degrees that is within a range of about 65% to 110%, or about 75% to about 110%, or about 80% to about 110%, or about 90% to about 110%, or may be about 100%. With the applied image receiving layer with a microporous surface, the created photo media may have a gloss at 20 degrees within a range of 40% to 50%, for example. In some examples, the gloss at 20 degrees of the photo media is within the range of about 42% and about 48%. As such, the photo media in accordance with the principles described herein is a high gloss photo media by definition herein, since the gloss at 20 degrees is equal to or exceeds 40%.

In some examples, the image receiving layer on the photo media substrate may further change the DOI of photo media substrate. For example, the photo media substrate may have a DOI that ranges from 3.6 mm$^{-1}$ to 5.0 mm$^{-1}$ before the image receiving layer is added to create the photo media. With the addition of the image receiving layer to the photo media substrate, the DOI, or range of DOI, may change to a range of 3.6 mm$^{-1}$ to 4.2 mm$^{-1}$, for example. In some examples, the DOI may be within the range of 3.6 mm$^{-1}$ to 4.0 mm$^{-1}$, or about 3.8 mm$^{-1}$ to about 4.0 mm$^{-1}$, or 3.9 mm$^{-1}$ to about 4.2 mm$^{-1}$. However, the DOI does not decrease below 3.6 mm$^{-1}$ according to the examples of the principles described herein.

FIG. 1A illustrates a schematic side view of a photo media (100) having high gloss according to an example of the principles described herein. The photo media (100) comprises a photo base substrate (120) and an image receiving layer (140) on the photo base substrate (120). The photo base substrate (120) comprises a photo base material (110) having a curl control composition (112) on a back side of the photo base material (110). The photo base substrate (120) further comprises a gloss-enhancement film (130) on a front side of the photo base material (110). In the example illustrated in FIG. 1A, the gloss-enhancement film (130) comprises a glossy layer (132) and an adherent layer (134), wherein the adherent layer (134) is directly adjacent to the front side of the photo base material (110) and sandwiched between the glossy layer (132) and the photo base material (110). The glossy layer (132) is a layer of a respective one of a polyester composition and a polypropylene composition. The image receiving layer (140) is located on the glossy layer (132).

In some examples, the adherent layer (134) illustrated in FIG. 1A comprises thermoplastic polymer, for example melted granules of polyethylene. For example, the thermoplastic polymer may be provided as a layer that is combined with the glossy layer (132), wherein the combination of layers is extrusion laminated to the photo base material (110). The image receiving layer (140) is coated onto the extrusion laminated glossy layer (132), for example using one or more of the deposition processes described above.

Figure 1B:
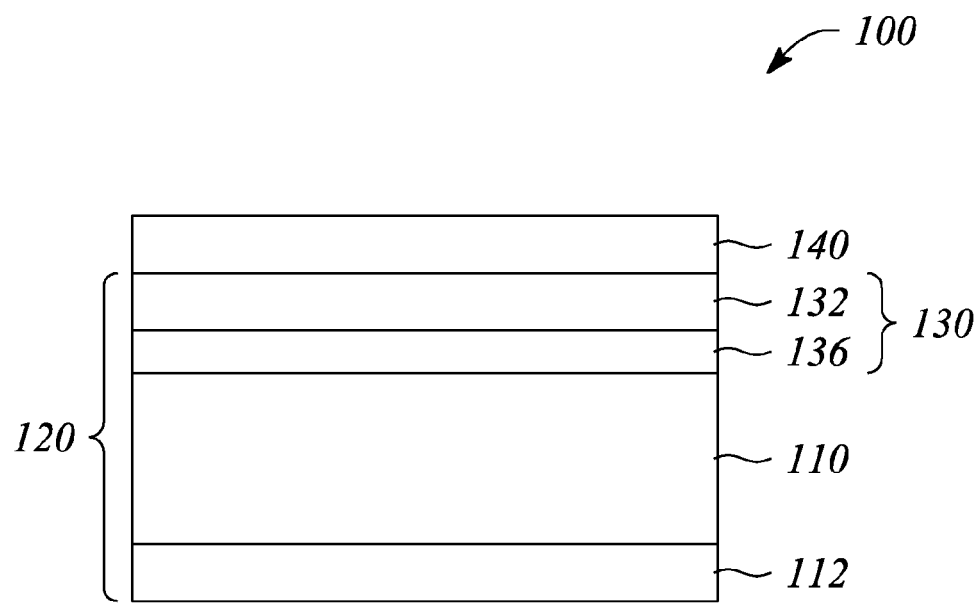

FIG. 1B illustrates a schematic side view of a photo media (100) having high gloss according to another example of the principles described herein. The photo media (100) comprises a photo base substrate (120) and an image receiving layer (140) on the photo base substrate (120). The photo base substrate (120) comprises a photo base material (110) having a curl control composition (112) on a back side of the photo base material (110). The photo base substrate (120) further comprises a gloss-enhancement film (130) on a front side of the photo base material (110). In the example illustrated in FIG. 1B, the gloss-enhancement film (130) comprises a glossy layer (132) and a coating layer of an adherent (136), wherein the adherent coating layer (136) is directly adjacent to the front side of the photo base material (110) and sandwiched between the glossy layer (132) and the photo base material (110). The glossy layer (132) is a layer of a respective one of a polyester composition and a polypropylene composition.

In some examples, the adherent coating layer (136) illustrated in FIG. 1B comprises thermal adhesive, for example casein, starch or a latex, or any of the thermal adhesives described above. For example, the thermal adhesive (136) may be coated onto one side of the glossy layer (132) and the adherent-coated glossy layer is wet laminated to the photo base material (110). In another example, the thermal adhesive (136) may be coated onto one side of the photo base material (110), and then the glossy layer (132) and the adherent-coated photo base material are wet laminated together. The image receiving layer (140) is coated onto the laminated glossy layer (132), for example, as described above.

Figure 1C:
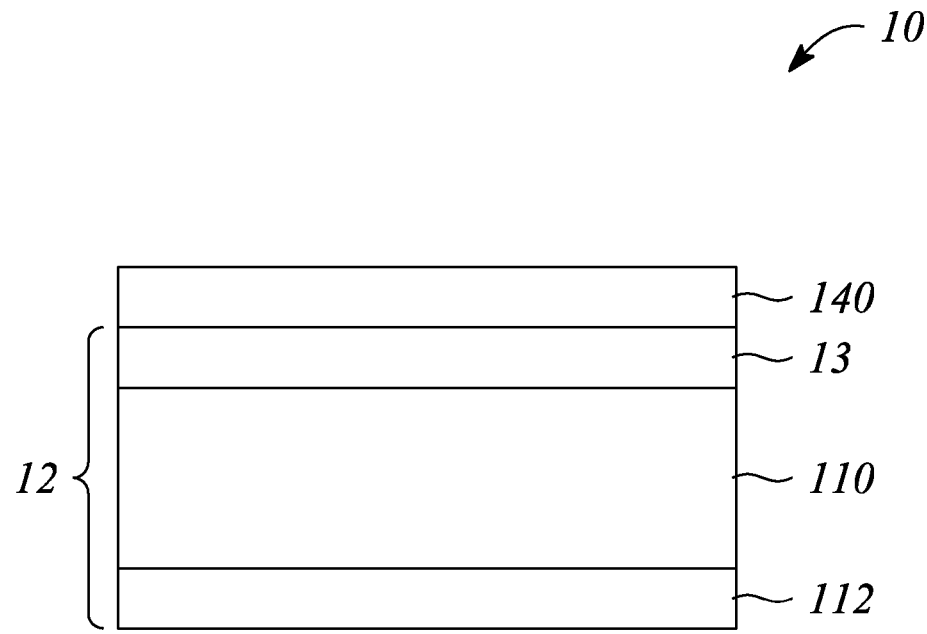
FIG. 1C illustrates a side view of a polyester composition or a polypropylene composition gloss layer without an adherent layer as a comparison, according to an example in accordance with the principles described herein.

FIG. 1C illustrates a schematic side view of a photo media (10) having a polyester composition or a polypropylene composition gloss layer without an adherent layer as a comparison according to an example of the principles described herein. The photo media (10) comprises a photo base substrate (12) and an image receiving layer (140) on the photo base substrate (12). The photo base substrate (12) comprises a photo base material (110) having a curl control composition (112) on a back side of the photo base material (110). The photo base substrate (12) further comprises a glossy film (13) on a front side of the photo base material (110). In the example illustrated in FIG. 1C, the glossy film (13) is directly adjacent to the front side of the photo base material (110). The glossy film (13) is a layer of a respective one of a polyester composition and a polypropylene composition, for example, without an adherent layer between the respective composition layer and the photo base material (110). In this comparative example, the glossy film (13) is extruded directly to the photo base material (110). Moreover, the image receiving layer (140) is coated onto the extruded glossy film (13), for example using one or more of the coating methods described above.

Figure 2:
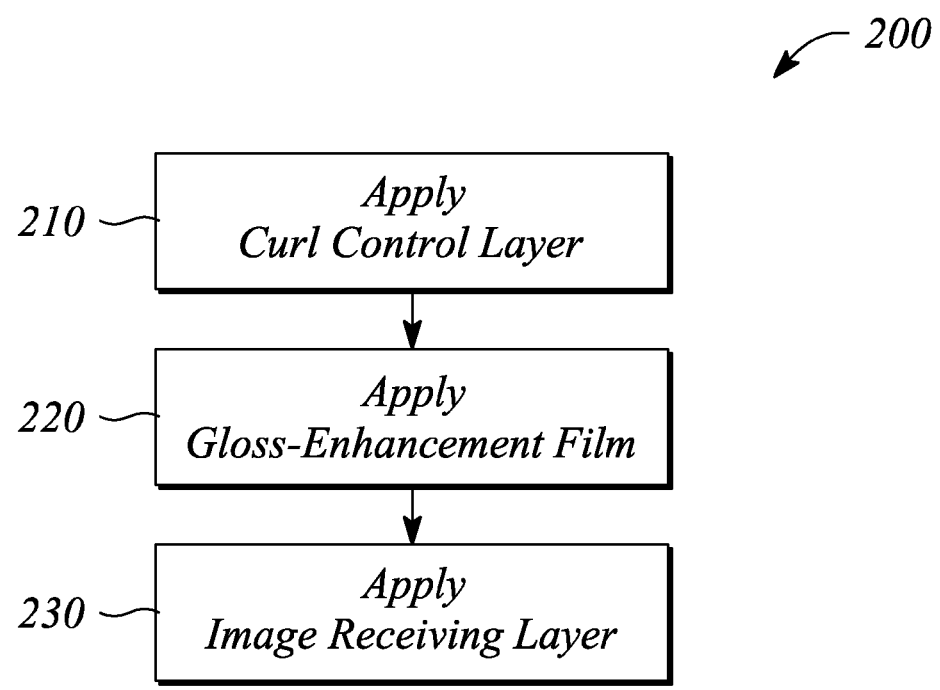
FIG. 2 illustrates a method of making high gloss photo media, according to an example in accordance with the principles described herein.

Some examples in accordance with the principles described herein are directed to a method of making a high gloss photo media. FIG. 2 illustrates a flow chart of the method (200) of making a high gloss photo media according to an example of the principles described herein. The method (200) of making comprises applying (210) a curl control composition on a first side of a photo base material. The curl control composition may be applied using a cold lamination method, for example. In some examples, the curl control composition is any of the curl control materials described above. In some examples, the photo base material is any of the photo base materials described above.

The method (200) of making the high gloss photo media further comprises applying (220) a gloss-enhancement film to a second side of the photo base material. The second side is opposite to the first side of the photo base material. The gloss-enhancement film comprises one of a polyester composition and a polypropylene composition and an adherent. In some examples, the gloss-enhancement film is applied to the photo base material using one of lamination, extrusion, and extrusion lamination. The gloss-enhancement film may be any of the gloss-enhancement films described above.

For example, the gloss-enhancement film may be wet laminated together with the photo base material. In some of these examples, the gloss-enhancement film is applied (220) comprising coating one side of a layer of the respective one of the polyester composition and the polypropylene composition with the adherent, for example a thermal adhesive as described above. The adherent-coated respective composition layer is then combined with the second side of the photo base material at a laminating nip. In particular, the adherent-coated side of the respective composition layer is directly adjacent to the second side of the photo base material. Using the laminating nip, the adherent-coated respective composition layer and the photo base material are wet laminated together. In some examples, the adherent may be coated directly on the second side of the photo base material instead of or in addition to the respective composition layer before combining at the lamination nip. For example, two webs (with a surface of one of the webs including the wet adhesive) are combined at the lamination nip and pressed together using a driven, chrome-plated steel roll and rubber coated pressure roll. One web is porous to allow evaporation. The pressure of the rolls adheres the webs together with the adhesive. Examples of wet lamination equipment include, but are not limited to, Talon 64 (152.4 cm wide web) from GBC, Lincolnshire, Ill.; 62 Pro laminating machine (152.4 cm wide web) from Seal, Elkridge, Md.; a lab unit lamination machine (60.96 cm wide web) for example, Matrix DUD™, which can be inserted at a first end, for example, at the main coating line, for coating and laminating nip two films to the photo base material on an opposite end; and those lamination machines from Polytype Converting Ltd., Freiburg, Switzerland. Coating and laminating machines may be obtained from Faustel, Germantown, Wis. and Black Clawson Ltd, Newport, South Wales, UK, for example.

In another example, the gloss-enhancement film may be extrusion laminated with the photo base material. In some of these examples, the gloss-enhancement film is applied (220) comprising melting thermoplastic granules to form an adherent layer; and then combining the adherent layer and a layer of a respective one of the polyester composition and the polypropylene composition together on the second side of the photo base material at a laminating nip. The adherent layer is directly adjacent to the second side of the photo base material when combined. Using the laminating nip, the respective combined layers and the photo base material are extrusion laminated together. For example, the thermoplastic granules are melted and formed into a thin hot film, which is coated onto a moving flat substrate of either the respective polymer composition film or the photo base material. The moving, coated substrate passes between a set of counter-rotating rolls with a moving flat substrate of the other of the polymer composition film or the photo base material. The set of counter-rotating rolls press the coating onto the substrates to ensure contact and adhesion. Extrusion lamination equipment may be obtained from Polytype Converting Ltd, Freiburg, Switzerland, for example.

In another example, the gloss-enhancement film may be extruded with the photo base material. In some examples, the gloss-enhancement film that includes a respective one of the polyester composition and the polypropylene composition and an adherent layer is applied (220) to the second side of the photo base material and is extruded together with an extruder. The adherent layer is positioned directly adjacent to the second side of the photo base material. Using the extruder, the combined respective composition layer, adherent layer and the photo base material are extruded together. In another example, a respective one of the polyester composition and the polypropylene composition is applied (220) to the second side of the photo base material without the use of an adherent, for example as a comparison. For example, a layer of a respective one of the polyester composition and the polypropylene composition (without addition of an adherent) is combined on the second side of the photo base material. The respective composition layer is directly adjacent to the second side of the photo base material when combined together. Using the extruder, the combined respective composition layer and the photo base material are extruded together. The extrusion process transfers a thermoplastic (e.g., the polyester composition or the PP composition) from a solid state to a melted state and compresses the thermoplastic against the flat photo base substrate using pressure of a die. Extruder equipment may be obtained from Davis-Standard, LLC, Pawcatuck, Conn. or Randcastle Extrusion Systems, Inc., Cedar Grove, N.J., for example. The photo media substrate made by the method (200) of making, as described herein, has a gloss at 20 degrees that is at least 60% and a DOI that is at least 3.6 $mm^{-1}$. In some examples, the photo media substrate made by the method (200) is substantially similar to the photo media substrate described above.

The method (200) of making high gloss photo media further comprises applying (230) an image receiving layer on the gloss-enhancement film. In some examples, the image receiving layer is applied (230) using any of the deposition processes described above. Moreover, in some examples, the image receiving layer is substantially similar to any of the image receiving layers, described above.

In accordance with the method (200) of making high gloss photo media, in some examples the amount (or thickness) of gloss-enhancement film ranges from at least 20 microns to about 54 microns, wherein the amount of adherent in the gloss-enhancement film ranges from 0.5 gsm to about 25 gsm, for example. In some examples, the amount of gloss-enhancement film is substantially similar to the amounts and ratios of components described above for the high gloss photo media. The high gloss photo media made by the method (200) of making described herein has a gloss at 20 degrees equal to or greater than 40% and a distinctness of image that is equal to or greater than 3.6 $mm^{-1}$. In some examples, the high gloss photo media made by the method (200) is substantially similar to the high gloss photo media described above.

Various examples in accordance with the principles described herein achieve both high gloss (i.e., equal to or greater than 40% at 20 degrees) and high DOI (i.e., equal to or greater than 3.6 $mm^{-1}$) and further in some examples, do so at a relatively lower cost than photo media having a glossy PE extruded layer using a mirror image chill roll on an extruder, for example. In some examples, the high gloss photo media according to examples of the principles described herein meets or exceeds the quality of silver halide paper.

As used herein, the article 'a' is intended to have its ordinary meaning in the patent arts, namely 'one or more'. For example, 'a material' generally means one or more materials and as such, 'the material' means 'the material(s)' herein. The phrase 'at least' as used herein means that the number may be equal to or greater than the number recited. The term 'about' as used herein means that the value recited is within the normal tolerances of the equipment used to measure the value, or in some examples, the value may differ by plus or minus 20%, or plus or minus 15%, or plus or minus 10%, or plus or minus 5%, or plus or minus 1%, for example. The term 'between' when used in conjunction with two numbers such as, for example, 'between about 2 and about 50' includes both of the numbers recited. Any ranges of values provided herein include values within or between the provided ranges. The term 'substantially' as used herein means a majority, or almost all, or all, or an amount with a range of about 51% to 100%, for example. Also, any reference herein to 'top', 'bottom', 'upper', 'lower', 'up', 'down', 'back', 'front', 'left' or 'right' is not intended to be a limitation herein. The designations 'first' and 'second' are used herein for the purpose of distinguishing between items, such as 'first side' and 'second side', and are not intended to imply any sequence, order or importance to one item over another item or any order of operation, unless otherwise indicated. Moreover, examples herein are intended to be illustrative only and are presented for discussion purposes and not by way of limitation.

In some examples, coat weight in grams per square meter (gsm) is approximately equivalent to thickness in microns (μm), for example 1 gsm approximately equals 1 μm.

Distinctness of Image (DOI) was measured using a portable DOI analysis system (DIAS™) from Quality Engineering Associates, Inc., (QEA), Billerica, Mass. The DIAS™ projects a sharp edge onto the sample under test and captures the reflections with a high-resolution CCD camera built into the DIAS™. Image analysis software built into the DIAS™ computes DOI in terms of sharpness and blurriness of the edge in the reflections. The DOI is measured by first projecting light onto a surface at a particular angle. The amount of reflected light is then measured at or around the specular angle, wherein the specular angle is an angle equal to but opposite to the normal of the surface of the reflecting object. Generally, the higher the measurement, the more light is reflected back, thus making the image clearer. Additionally, multiple measurements may be taken across the surface and averaged, since there may be one or both of variations and defects (due to manufacturing processes) in the surface being measured.

Gloss was measured at a 20 degree angle to the surface using a Tri-gloss meter by BYK Gardner-USA of Columbia, Md. Five data points were measured and an average of the five data points was reported.

EXAMPLES

All measured values are within measurement tolerance for the equipment used, unless otherwise indicated.

Photo Media Substrate Samples: Photo Media Substrate (PS) Samples 1-6 were created as specified in Table 1 below. Polyethylene, as a curl control material, was extruded to a back side of raw paper-based photo sheets (171 gsm) using a pilot extruder. The pilot extruder had a mirror imaged chill roll. The polyethylene used had a melting index between 3 to 10 (g/10 min) per ASTM D1238-79 procedure, and process temperature from 280° C. to 350° C. (e.g., Chevron 1017 PE from Chevron Phillips Chemical Company). The back side PE was 1.5 to 3 times as thick as the specified gloss layer in Table 1.

Then, PS Samples 1, 3-4 were extrusion laminated with a PET layer and a PE adherent as a gloss-enhancement film; and PS Sample 2 was extrusion laminated with a PP and EVA layer and a PE adherent as the gloss-enhancement film, using a pilot extrusion laminator. Chevron 1017 PE adherent from Chevron Phillips was extruded on the photo base sheets having back side PE mentioned above, and the melted PE adherent on the paper base was laminated together with the PET layer (PS Samples 1, 3-4) or the PP and EVA layer (PS Sample 2) at a laminating nip to provide adhesion and then cooled. PS Sample 5 was wet laminated with a PET layer coated on one side with a thermal adhesive as the gloss-enhancement film. For PS Sample 5, a synthetic latex thermal adhesive, Ethocel ethylcellulose polymer (Dow Chemical Company) was coated on a 48 gauge PET film, Skyrol type SP65 from SKC, Inc., Atlanta, Ga., and the coated PET film was wet laminated to the photo base paper using a lab unit laminating machine, e.g., a hot laminator, 60.96 centimeters (cm) (24 inches) wide, which may be available from Elmstok, UK. The PS Sample 5 was 38.1 cm (15 inches) wide. Sample 6 was extruded with the PET layer as a glossy layer without an adherent using the pilot extruder mentioned above.

Control Substrate Samples: Control Substrate (CS) Samples 1-3 were commercially available papers, e.g., HP Everyday photo paper, HP Advanced photo paper, and HP Premium Plus photo paper, respectively, having a PE curl control back side layer and increasing amounts of PE as a glossy layer, as specified in Table 1. For the commercially available papers, the photo base paper of 171 gsm had been extruded with the PE gloss layers using a commercial extruder.

Gloss Measurements: The PS Samples 1-6 and the CS Samples 1-3 were measured for gloss at 20 degrees using the Tri-gloss meter from BYK Gardner, mentioned above. Gloss measurements were taken in the machine direction and cross direction of the paper. An average gloss measurement at 20 degrees (in the machine direction) for each Sample type (PS 1-6) and Control (CS 1-3) was calculated and reported in Table 1.

Distinctness of Image Measurements: The PS Samples 1-6 and the CS Samples 1-3 were measured for DOI using DIAS analysis system from QEA described above. For each sample, five measurements were made. A total average of blurring and a total average of sharpness were calculated for each Sample type. The DOI total average of sharpness values are reported in Table 1.

Photo Media Samples: PS Samples 2 and 4 were coated with 28.5 gsm of an image receiving layer on a front side of the respective Substrates using a pilot curtain coater to make Photo Media (PM) Samples 2 and 4. The image receiving layer included, for example, about 70 to 100% by dry weight of fumed silica (high porosity inorganic oxide dispersion); about 5 to 15% dry weight of an organosilane treating agent; about 1% to 5% dry weight of an inorganic treating agent; about 0.1% to 1% dry weight of a surfactant, about 1 to 5% dry weight of a binder cross-linker; and about 15 to 30% dry weight of a binder, as described in more detail above.

Control Media Samples: CS Samples 1-3 were also coated with 28.5 gsm of the same image receiving layer on a front side of the Control Substrates using the pilot curtain coater to make Control Media (CM) Samples 1-3.

Gloss and DOI Measurements on Media Samples: Both gloss at 20 degrees and DOI were measured on PM Samples 2 and 4 and CM Samples 1-3, as described above. The results are listed in Table 1.

TABLE 1

| Layers: | SAMPLES: | | | | | | | | |
|---|---|---|---|---|---|---|---|---|---|
| | PS 1 | PS 2 | PS 3 | PS 4 | PS 5 | PS 6 | CS 1 | CS 2 | CS 3 |
| Adherent (gsm): | | | | | | | | | |
| PE Adherent | 10 | 20 | 10 | 20 | | | | | |
| Thermal Adhesive | | | | | 20 | | | | |
| Gloss Layer: | | | | | | | | | |
| PE (gsm) | | | | | | | 15 | 20 | 26 |
| PET film (μm) | 12 | | 40 | 12 | 12 | 40 | | | |

TABLE 1-continued

| Layers: | PS 1 | PS 2 | PS 3 | PS 4 | PS 5 | PS 6 | CS 1 | CS 2 | CS 3 |
|---|---|---|---|---|---|---|---|---|---|
| PP + EVA film (μm) | | 30 | | | | | | | |
| Measurements: | | | | | | | | | |
| Gloss at 20° (%) | 12.6 | 100.2 | 75.6 | 109.5 | 99.7 | 61.1 | 45.3 | 55.5 | 73.0 |
| DOI (mm$^{-1}$) | 0.64 | 4.73 | 4.26 | 3.73 | 3.96 | 3.95 | 1.53 | 2.64 | 3.51 |

| Media (with Image Receiving Layer) | PM 2 | PM 4 | CM 1 | CM 2 | CM 3 |
|---|---|---|---|---|---|
| Gloss at 20° (%) | 42 | 48 | 27.5 | 31.5 | 33 |
| DOI (mm$^{-1}$) | 3.9 | 3.8 | 2.0 | 2.64 | 3.51 |

The results for samples PS 2-5 and PM 2 and PM 4 in Table 1 illustrated enhanced gloss at 20 degrees and enhanced DOI for the photo media substrate (PS) and the resultant photo media (PM) when compared to the control samples CS 1-3 with a PE gloss layer and no adherent layer. The results for sample PS 1 in Table 1 may illustrate, from a gloss enhancement perspective, a potential limitation in one or more of the particular combination of materials chosen for the gloss enhancement film, the amounts of the chosen materials used, and possibly the method used for combining the chosen materials to the photo base material, for example. Also further illustrated in Table 1 is that a glossy layer of PET of 40 microns thick without an adherent layer (sample PS 6) did not enhance the gloss at 20 degrees as much as the gloss-enhancement film (samples PS 2-5 and PM 2 and 4) with an adherent layer, as described herein.

Thus, there have been described examples of a high gloss photo media having a gloss at 20 degrees equal to or greater than 40% and a DOI that is equal to or greater than 3.6 mm$^{-1}$ and a method of making same. It should be understood that the above-described examples are merely illustrative of some of the many specific examples that represent the principles of what is claimed. Clearly, those skilled in the art can readily devise numerous other arrangements without departing from the scope defined by the following claims.

What is claimed is:

1. A high gloss photo media comprising:
a photo media substrate comprising a photo base material having a front side and a back side opposite the front side; a layer of a curl control material on the back side of the photo base material; and a gloss-enhancement film on the front side of the photo base material, a thickness of the gloss-enhancement film being at least 20 microns, the gloss-enhancement film being a multilayer comprising an adherent layer and a layer of one of a polyester composition and a polypropylene composition; and
an image receiving layer on the gloss-enhancement film, the photo media having a gloss at 20 degrees that is equal to or greater than 40%.

2. The photo media of claim 1, wherein the polyester composition comprises a layer of polyethylene terephthalate.

3. The photo media of claim 1, wherein the polypropylene composition comprises adjacent layers of polypropylene and poly(ethylene vinyl acetate).

4. The photo media of claim 1, wherein the adherent layer comprises one of a thermal adhesive and a thermoplastic polymer, an amount by coat weight of the adherent being about 10 grams per square meter (gsm) to 25 gsm.

5. The photo media of claim 1, wherein the adherent layer comprises polyethylene, casein, sodium silicate, starch, natural latex, synthetic latex, a starch-based adhesive, an acrylic copolymer adhesive, a pressure-sensitive adhesive, or a combination of two or more thereof, the layer of a respective one of the polyester composition and the polypropylene composition having a thickness with a range of 10 microns to 42 microns.

6. The photo media of claim 1, wherein the polyester composition is a layer of polyethylene terephthalate (PET), the polypropylene composition being adjacent layers of polypropylene and poly(ethylene vinyl acetate) (PP and EVA), the adherent layer being a layer of melted polyethylene granules between the front side of the photo base material and a respective one of the PET layer and the PP and EVA layers, an amount of the respective one of the PET layer and the PP and EVA layers to an amount of the adherent being a ratio of one of 4 to 1, 3 to 2, 3 to 5 and 1 to about 2.

7. The photo media of claim 1, wherein an amount of the curl control material on the back side of the photo base material is 1.5 to 3 times the amount of the gloss-enhancement film on the front side of the photo base material.

8. The photo media of claim 1, wherein the photo media substrate has a percent gloss at 20 degrees that is equal to or greater than 75%, and wherein each of the photo media substrate and the photo media has a distinctness of image (DOI) that is equal to or greater than 3.6 mm$^{-1}$.

9. A high gloss photo media comprising:
a photo media substrate comprising:
a layer of a polymer composition on a back side of a photo base material to control curl; and
a gloss-enhancement film comprising an adherent layer and either a layer of polyethylene terephthalate (PET) or layers of polypropylene and poly(ethylene vinyl acetate) (PP and EVA) on a front side of the photo base material to enhance gloss of the photo media substrate, an amount of the curl control polymer composition being from 1.5 to 3 times an amount of the gloss-enhancement film, a thickness of the gloss-enhancement film being at least 28 microns; and
an image receiving layer on the gloss-enhancement film, the photo media having a gloss at 20 degrees that is equal to or greater than 40%.

10. The photo media of claim 9, wherein the adherent layer comprises one of a thermal adhesive and a thermoplastic polymer, an amount of the PET layer or the PP and EVA layers to an amount of the adherent layer being a ratio of one of 4 to 1, 3 to 2, 3 to 5 and 1 to about 2.

11. A method of preparing high gloss photo media, the method comprising:

applying a curl control composition on a first side of a photo base material;

applying a gloss-enhancement film to a second side of the photo base material, the gloss-enhancement film comprising an adherent layer and a layer of either a polyester composition or a polypropylene composition that are one of laminated, extruded and extrusion laminated to the photo base material, a thickness of the gloss-enhancement film being at least 20 microns; and applying an image receiving layer on the gloss-enhancement film, the photo media having a gloss at 20 degrees equal to or greater than 40% and a distinctness of image that is equal to or greater than 3.6 mm$^{-1}$.

12. The method of claim 11, wherein applying a gloss-enhancement film comprises:

melting thermoplastic granules to form the adherent layer;

combining the adherent layer and the layer of a respective one of the polyester composition and the polypropylene composition on the second side of the photo base material at a laminating nip, the adherent layer being directly adjacent to the second side; and extrusion laminating the adherent layer and the respective composition layer with the photo base material.

13. The method of claim 11, wherein applying a gloss-enhancement film comprises:

coating the second side of the photo base material or one side of the layer of a respective one of the polyester composition and the polypropylene composition with the layer of the adherent;

combining the respective composition layer with the second side of the photo base material at a laminating nip, the adherent being between the respective composition layer and the photo base material; and wet laminating the respective composition layer, the adherent and the photo base material together.

14. The method of claim 11, wherein applying a gloss-enhancement film comprises extruding the layer of a respective one of the polyester composition and the polypropylene composition and the adherent layer to the second side of the photo base material, an amount of the adherent layer being within a range of 0.5 grams per square meter (gsm) to 25 gsm.

15. The method of claim 11, wherein an amount of the curl control composition is 1.5 to 3 times an amount of the gloss-enhancement film, a thickness of the layer of a respective one of the polyester composition and the polypropylene composition being within a range of 10 microns to 42 microns, the image receiving layer having a coat weight within a range of 25 grams per meter (gsm) to 32 gsm.

* * * * *